United States Patent
Nakajima

(10) Patent No.: US 12,166,573 B2
(45) Date of Patent: Dec. 10, 2024

(54) COMMUNICATION APPARATUS AND CONTROL METHOD FOR REDUCING SIGNAL COLLISION

(71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 17/464,748

(22) Filed: Sep. 2, 2021

(65) Prior Publication Data

US 2021/0399830 A1   Dec. 23, 2021

Related U.S. Application Data

(63) Continuation of application No. PCT/JP2020/005462, filed on Feb. 13, 2020.

(30) Foreign Application Priority Data

Mar. 11, 2019   (JP) .................................. 2019-044194

(51) Int. Cl.
*H04L 1/00*  (2006.01)
*G06F 3/12*  (2006.01)
*H04W 76/14*  (2018.01)
*H04W 84/12*  (2009.01)

(52) U.S. Cl.
CPC .......... *H04L 1/0025* (2013.01); *G06F 3/1292* (2013.01); *H04W 76/14* (2018.02); *H04W 84/12* (2013.01)

(58) Field of Classification Search
CPC .... H04L 1/0025; G06F 3/1292; H04W 76/14; H04W 84/12; H04W 16/10; H04W 76/10; Y02D 30/70
See application file for complete search history.

(56) References Cited

U.S. PATENT DOCUMENTS

| 10,219,182 B1 | 2/2019 | Hahn et al. | |
| 2014/0056209 A1* | 2/2014 | Park | H04W 16/26 370/315 |
| 2014/0126461 A1* | 5/2014 | Ghosh | H04W 16/26 370/336 |

(Continued)

FOREIGN PATENT DOCUMENTS

| JP | 2017-225091 A | 12/2017 |
| WO | 2013/133856 A1 | 9/2013 |

OTHER PUBLICATIONS

International Search Report issued by the Japan Patent Office on Apr. 21, 2020 in corresponding International Application No. PCT/JP2020/005462, with English translation.

*Primary Examiner* — Benjamin H Elliott, IV
*Assistant Examiner* — Yewon Kim
(74) *Attorney, Agent, or Firm* — Carter, DeLuca & Farrell LLP

(57) ABSTRACT

A communication apparatus operable in both a base station mode and a terminal mode, obtains identification information of a first wireless network to be connected in the terminal mode; and establishes, when operating in the base station mode, a second wireless network having the same identification information as the obtained identification information.

10 Claims, 12 Drawing Sheets

(56) References Cited

U.S. PATENT DOCUMENTS

| | | | |
|---|---|---|---|
| 2014/0233546 A1* | 8/2014 | Vallabhu | H04W 76/14 |
| | | | 370/338 |
| 2016/0374087 A1* | 12/2016 | Liu | H04W 72/0453 |
| 2017/0105222 A1* | 4/2017 | Nieman | H04W 76/14 |
| 2018/0376467 A1* | 12/2018 | Patil | H04B 7/063 |
| 2020/0106579 A1* | 4/2020 | Cherian | H04W 52/38 |
| 2021/0185751 A1 | 6/2021 | Nakajima | |

* cited by examiner

F I G. 6

| 601 | 602 | 603 | 604 | 605 | 606 | 607 | 608 |
|---|---|---|---|---|---|---|---|
| Element ID | Length | Element ID Extension | HE Operation Parameters | BSS Color Information | Basic HE-MCS And NSS Set | VHT Operation Information | Max Co-Located BSSID Indicator |
| Octets: 1 | 1 | 1 | 3 | 1 | 2 | 0 or 3 | 0 or 1 |

605

| 609 | 610 | 611 |
|---|---|---|
| BSS Color | Partial BSS Color | BSS Color Disabled |
| Bits: 6 | 1 | 1 |

COMMUNICATION APPARATUS AND CONTROL METHOD FOR REDUCING SIGNAL COLLISION

CROSS-REFERENCE TO RELATED APPLICATIONS

This application is a Continuation of International Patent Application No. PCT/JP2020/005462, filed Feb. 13, 2020, which claims the benefit of Japanese Patent Application No. 2019-044194 filed Mar. 11, 2019, both of which are hereby incorporated by reference herein in their entirety.

BACKGROUND OF THE INVENTION

Field of the Invention

The present invention relates to a wireless communication technique.

Background Art

In recent years, the IEEE802.11ax standard that aims at efficient use of wireless media in an environment in which a number of wireless communication apparatuses exist has been examined. SR (Spatial Reuse) processing has been examined as a technique for effectively using wireless media by a plurality of BSSs (Basic Service Sets). The SR processing is a communication technique for efficiently using wireless media in an OBSS (Overlapping BSS) environment in which a plurality of BSSs are arranged to overlap each other. A method of transmitting BSS Color information as identification information for identifying a BSS by including it in a physical layer header has been examined (PTL 1).

CITATION LIST

Patent Literature

PTL 1: Japanese Patent Laid-Open No. 2017-225091

In recent years, Wi-Fi Direct has been increasingly mounted on wireless LAN communication apparatuses. In Wi-Fi Direct, one communication apparatus operates as a simple access point (AP) called a group owner (GO), and a counter communication apparatus is wirelessly connected, as a client, to the GO to perform direct communication. Furthermore, the communication apparatus mounted with Wi-Fi Direct includes an apparatus capable of performing so-called concurrent connection in which the apparatus is connected, as a station (STA) in an infrastructure mode, to a wireless network established by the AP while operating as a GO.

However, if, in concurrent connection, a network on the GO side established by the self-apparatus and a network to which the self-apparatus is connected as an STA operate using the same frequency and different BSS colors, signal collision highly probably occurs. For example, depending on a radio wave environment, at the timing when the self-apparatus transmits data to the AP via an interface (I/F) on the STA side, the client apparatus on the GO performs the SR processing to transmit data to the GO, resulting in signal collision.

The present invention has been made in consideration of the above problem, and has an object of making it possible to reduce signal collision in wireless communication.

SUMMARY OF THE INVENTION

To solve the above problem, a communication apparatus according to the present invention has the following arrangement. That is, there is provided a communication apparatus operable in both a base station mode of establishing a wireless network and accepting connection from another apparatus and a terminal mode of performing connection to a wireless network established by another apparatus, comprising: an obtaining unit configured to obtain identification information of a first wireless network to be connected in the terminal mode; and an establishment unit configured to establish, when operating in the base station mode, a second wireless network having the same identification information as the obtained identification information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a view showing an example of the format of an information element (IE).

DESCRIPTION OF THE EMBODIMENTS

Figure 1:
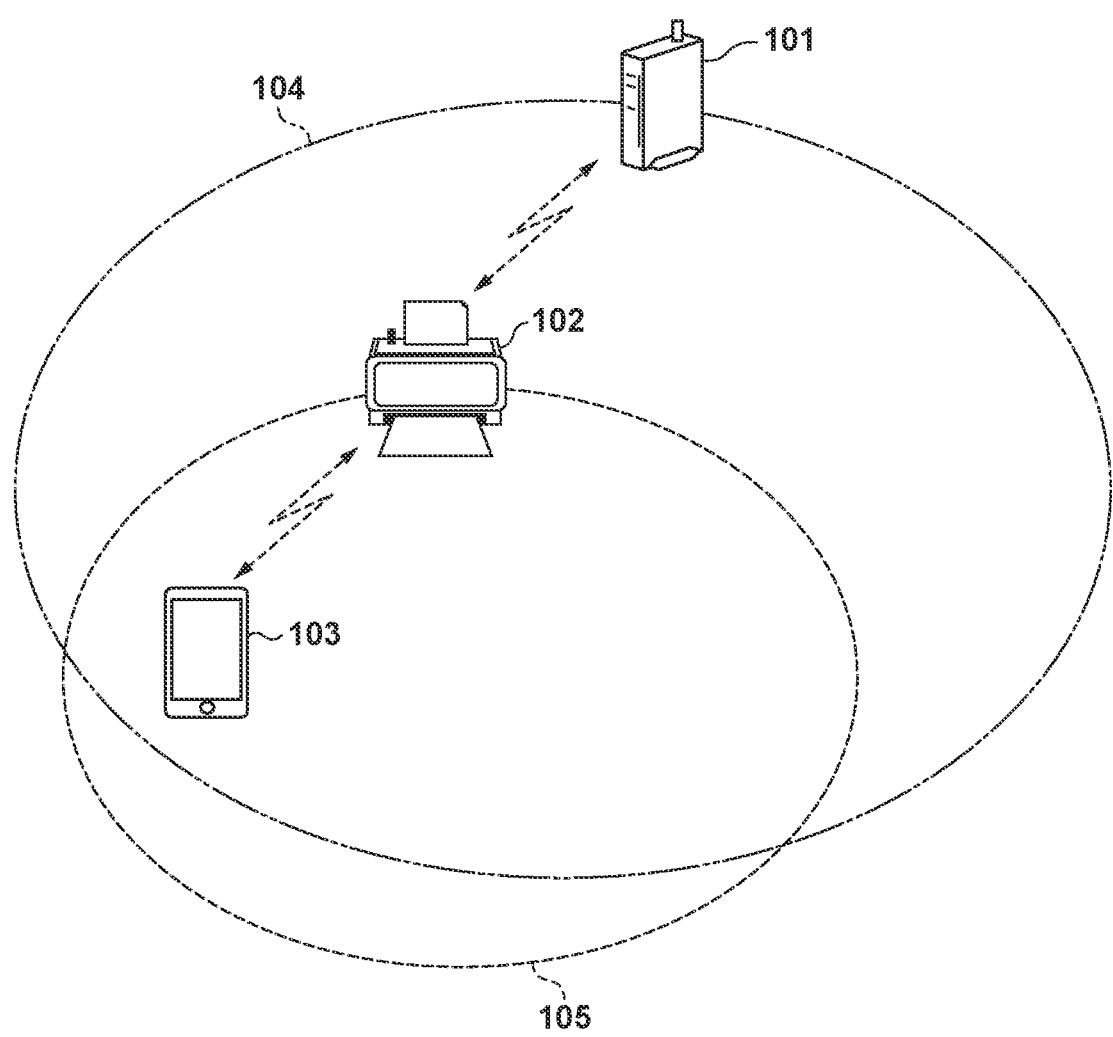
FIG. 1 is a view showing the configuration of a communication system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A printer in a wireless LAN system will be exemplified as the first embodiment of a wireless communication apparatus according to the present invention below Note that an example in which a wireless LAN system complying with the IEEE (Institute of Electrical and Electronics Engineers) 802.11 series is used will be described below but other wireless communication standards may be used.

In a wireless LAN, collision avoidance by the CSMA/CA (Carrier Sense Multiple Access/Collision Avoidance) scheme is used. In CSMA/CA, it is determined whether another communication apparatus currently transmits a signal, and if it is determined that the other communication apparatus currently transmits no signal, a signal of a self-apparatus is transmitted, thereby avoiding signal collision.

Furthermore, in SR (Spatial Reuse) processing, when another communication apparatus currently transmits a signal, if the self-apparatus receives the signal, it is identified whether the signal is a signal for a BSS to which the self-apparatus belongs. Then, if the signal is a signal for a BSS other than the BSS to which the self-apparatus belongs, it is determined whether the transmission signal of the self-apparatus influences another BSS. If it is determined that there is no influence, transmission of the signal from the self-apparatus makes it possible to efficiently use wireless media. Note that as a practical operation, two schemes of the OBSS_PD (Overlapping BSS Packet Detect) scheme and the SRP (Spatial Reuse Parameters) scheme have been examined.

The OBSS_PD scheme is a scheme in which if a received signal belongs to another BSS, a carrier sense level at which the signal of the self-apparatus can be transmitted is dynamically changed by controlling a carrier sense threshold and transmission power, thereby transmitting the signal. The SRP scheme is a scheme in which a notification of a parameter value concerning a reception interference level allowed in a BSS to which an access point (AP) belongs is made, and a terminal belonging to another BSS decides a transmission level based on the value to transmit a signal.

A communication apparatus capable of performing concurrent connection can perform wireless communication complying with the IEEE802.11ax standard (to be simply referred to as 802.11ax hereinafter) in both a network on the group owner (GO) side and the network of a connection destination AP to which the apparatus is connected as a station (STA). In 802.11ax, a BSS color is defined as identification information for identifying each network (BSS).

System Configuration

FIG. 1 is a view showing the configuration of a communication system according to the first embodiment. An access point (AP) 101 is a communication apparatus having the function of a base station, and each of a printer 102 and a smartphone 103 is a communication apparatus serving as a user terminal. Each of the printer 102 and the smartphone 103 has a Wi-Fi Direct function. In this example, the printer 102 operates as a Wi-Fi Direct GO and the smartphone, 103 operates as a Wi-Fi Direct client.

A Tireless network 104 is a network that connects the AP 101 and the printer 102, and a wireless network 105 is a wireless network that connects the printer 102 and the smartphone 103. Furthermore, the wireless network 104 is a wireless network formed by the AP 101, and the wireless network 105 is a wireless network formed by the printer 102.

That is, the AP 101 operates as an access point in an infrastructure (infra) mode in the wireless network 104. On the other hand, the printer 102 can operate as an STA in the infrastructure mode in the wireless network 104 while operating as a Wi-Fi Direct GO in the wireless network 105. Note that the printer 102 can perform a concurrent operation in which the operation as the STA and the operation as the GO as described above are performed concurrently. The smartphone 103 can operate as an STA in the infrastructure mode or a Wi-Fi Direct client in the wireless network 105. Note that the infrastructure mode in the printer 102 is a mode in which the printer 102 is connected, as a station (STA), to the wireless network established by the AP.

Note that at the time of the concurrent operation, a wireless channel (frequency channel) when the smartphone 103 operates as a GO is the same as that of the wireless network 104 established by the AP 101. In addition, the AP 101, the printer 102, and the smartphone 103 comply with 802.11ax, and can perform operations based on the SR processing.

Note that in the following description, a plurality of apparatuses constituting the communication system will be described as the AP, printer, and smartphone. However, for example, other apparatuses such as a mobile phone, a PC, a video camera, a smartwatch, a PDA, and a camera may be used. A case in which one client is connected to the wireless network 105 established by the printer 102 as a GO will be described but two or more clients may be connected.

In the following description, a case in which the AP 101 and the printer 102 are connected to each other in the wireless LAN infrastructure mode, and the printer 102 and the smartphone 103 are connected to each other by Wi-Fi Direct will be described. Next, the functional arrangement of each apparatus constituting the communication system will be described. Note that the functional arrangement of the AP 101 is the same as the arrangement of a general access point operable with the 802.11ax function and a description thereof will be omitted.

Figure 2:
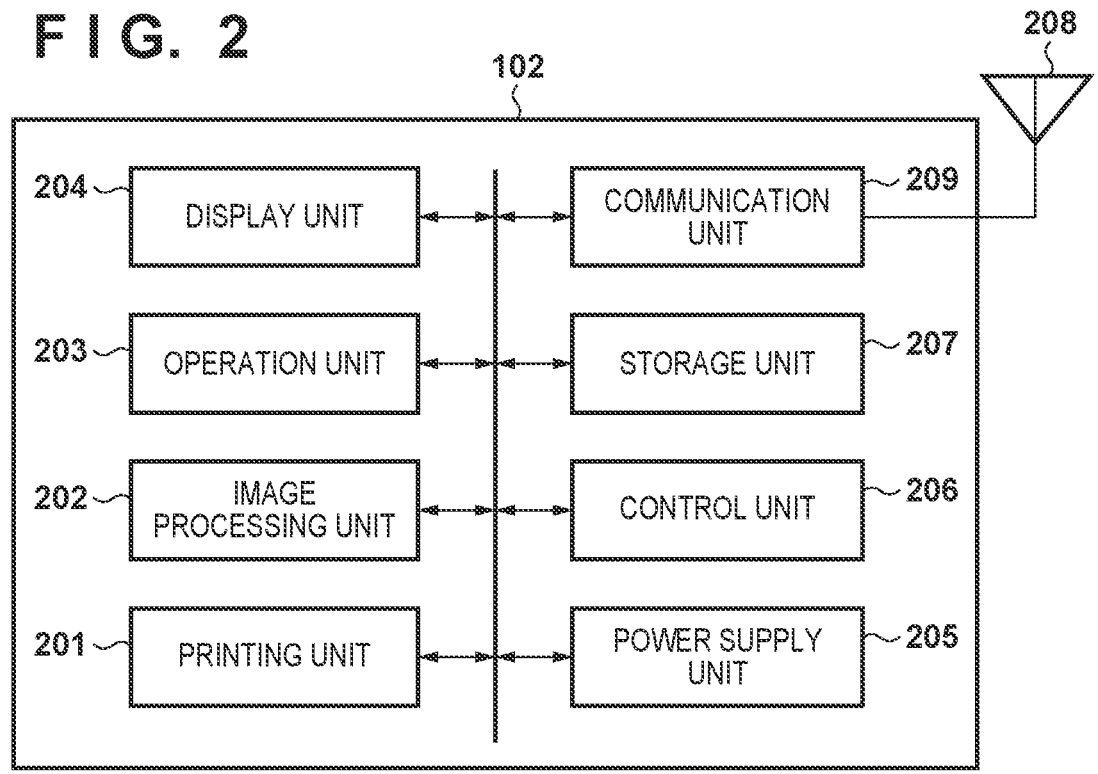
FIG. 2 is a block diagram showing the functional arrangement of a printer.

FIG. 2 is a block diagram showing the functional arrangement of the printer 102. A printing unit 201 performs print processing. An image processing unit 202 performs, before the printing unit 201 performs print processing, image processing of an image to be printed. An operation unit 203 accepts, from a user, various inputs to the printer 102 and the like. A control unit 206 controls the overall printer 102 based on information input via the operation unit 203. Among the pieces of information input via the operation unit 203, information that needs to be stored is stored in a memory such as a storage unit 207.

A display unit 204 has a function capable of outputting information that can visually be recognized or outputting the sound of a loudspeaker or the like. That is, the display unit 204 outputs at least one of visual information and sound information. If visual information is displayed, the display unit 204 includes a VRAM that holds image data corresponding to the visual information to be displayed. The display unit 204 performs display control to continuously display the image data stored in the VRAM.

A power supply unit 205 is a power supply unit that supplies power to each unit of the printer 102. The power supply unit 205 obtains power from, for example, an AC power supply or a battery. The control unit 206 controls the overall printer by executing a control program stored in the storage unit 207. The control unit 206 is formed by a CPU or an MPU. Note that the overall printer 102 may be controlled in cooperation with an OS (Operating System) executed by the control unit 206. Various operations (to be described later) are performed when the control unit 206 executes the control program stored in the storage unit 207.

The storage unit 207 stores various kinds of information such as the control program to be executed by the control unit 206 and information concerning communication. The storage unit 207 is formed by a storage medium such as an HDD, a flash memory, a detachable SD card, a ROM, or a RAM.

An antenna 208 is an antenna capable of performing communication in a 2.4-GHz band and/or a 5-GHz band for performing wireless LAN communication. A communication unit 209 is a wireless communication unit for performing wireless LAN communication complying with the IEEE802.11 series. As described above, wireless communication complying with 802.11 ax is also possible. Assume here that the communication unit 209 of the printer 102 is formed by one chip (one RF (Radio Frequency) circuit).

Figure 3:
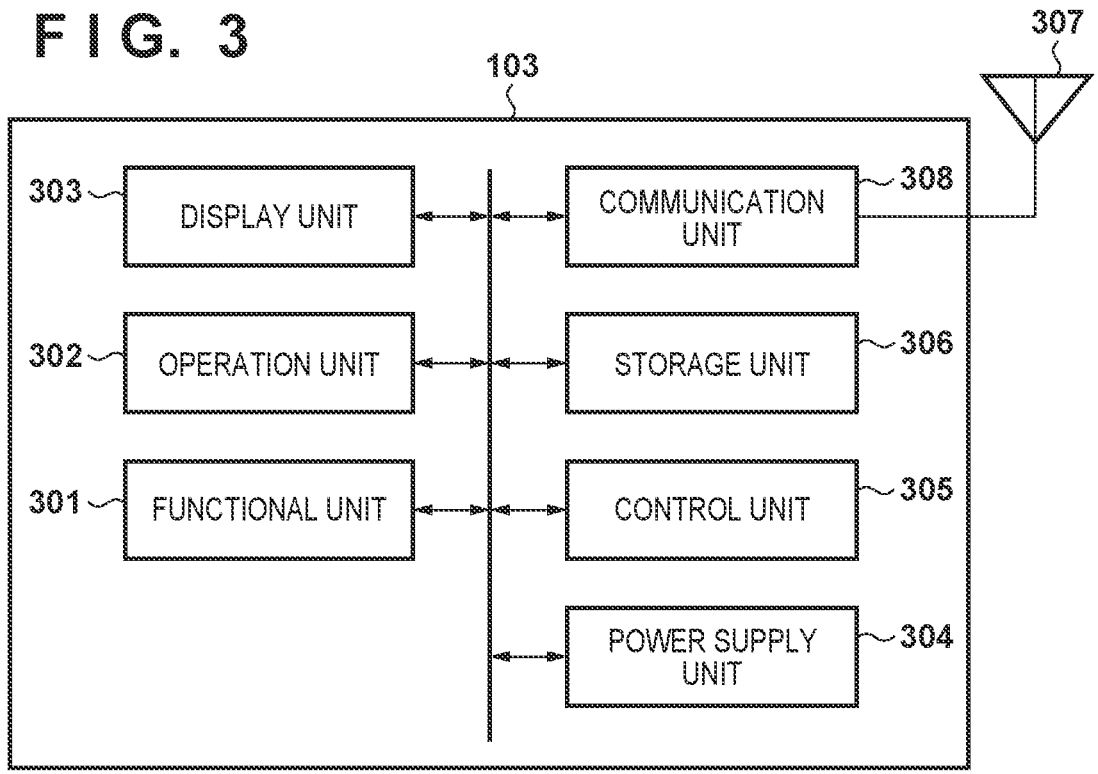
FIG. 3 is a block diagram showing the functional arrangement of a smartphone.

FIG. 3 is a block diagram showing the functional arrangement of the smartphone 103. A functional unit 301 provides a function unique to the smartphone. The functional unit 301 is implemented by predetermined hardware, predetermined software, or a combination thereof. An operation unit 302 accepts, from a user, various inputs to the smartphone 103 and the like. A control unit 305 controls the overall smartphone 103 based on information input via the operation unit 302. Among the pieces of information input via the operation unit 302, information that needs to be stored is stored in a memory such as a storage unit 306.

A display unit 303 has a function capable of outputting information that can visually be recognized or outputting the sound of a loudspeaker or the like. That is, the display unit 303 outputs at least one of visual information and sound information. If visual information is displayed, the display unit 303 includes a VRAM that holds image data corresponding to the visual information to be displayed. The display unit 303 performs display control to continuously display the image data stored in the VRAM.

A power supply unit 304 is a power supply unit that supplies power to each unit of the smartphone 103. The power supply unit 304 obtains power from, for example, an AC power supply or a battery. The control unit 305 controls the overall smartphone by executing a control program stored in the storage unit 306. The control unit 305 is formed by a CPU or an MPU. Note that the overall smartphone 103 may be controlled in cooperation with an OS (Operating System) executed by the control unit 305. Various operations (to be described later) are performed when the control unit 305 executes the control program stored in the storage unit 306.

The storage unit 306 stores various kinds of information such as the control program to be executed by the control unit 305 and information concerning communication. The storage unit 306 is formed by a storage medium such as an HDD, a flash memory, a detachable SD card, a ROM, or a RAM.

An antenna 307 is an antenna capable of performing communication in a. 2.4-GHz band and/or a 5-GHz band for performing wireless LAN communication. A communication unit 308 is hardware for performing wireless LAN communication complying with the IEEE802.11 series. As described above, wireless communication complying with 802.11 ax is also possible.

Operation of System

Subsequently, the operation of the communication system having the above-described arrangement will be described. For the sake of descriptive simplicity, assume that the printer 102 performs connection processing to the AP 101 in the wireless LAN infrastructure mode, and then performs connection processing to the smartphone 103 by Wi-Fi Direct. Assume also that the wireless network 104 is established by the AP 101, and the AP 101 and the printer 102 perform wireless LAN communication complying with 802.11ax. Furthermore, the wireless network 105 is established by the printer 102 operating as a GO, and the smartphone 103 serves as a client to perform Wi-Fi Direct connection. The printer 102 and the smartphone 103 perform wireless LAN communication complying with 802.11ax.

In addition, both the wireless networks 104 and 105 can be established to be able to use the SR processing. Whether to actually enable the SR processing is decided by the apparatus that establishes the wireless network. As a scheme used for the SR processing, either the above-described OBSS_PD scheme or the above-described SRP scheme may be used, and the present invention is not limited to them.

Figure 4:
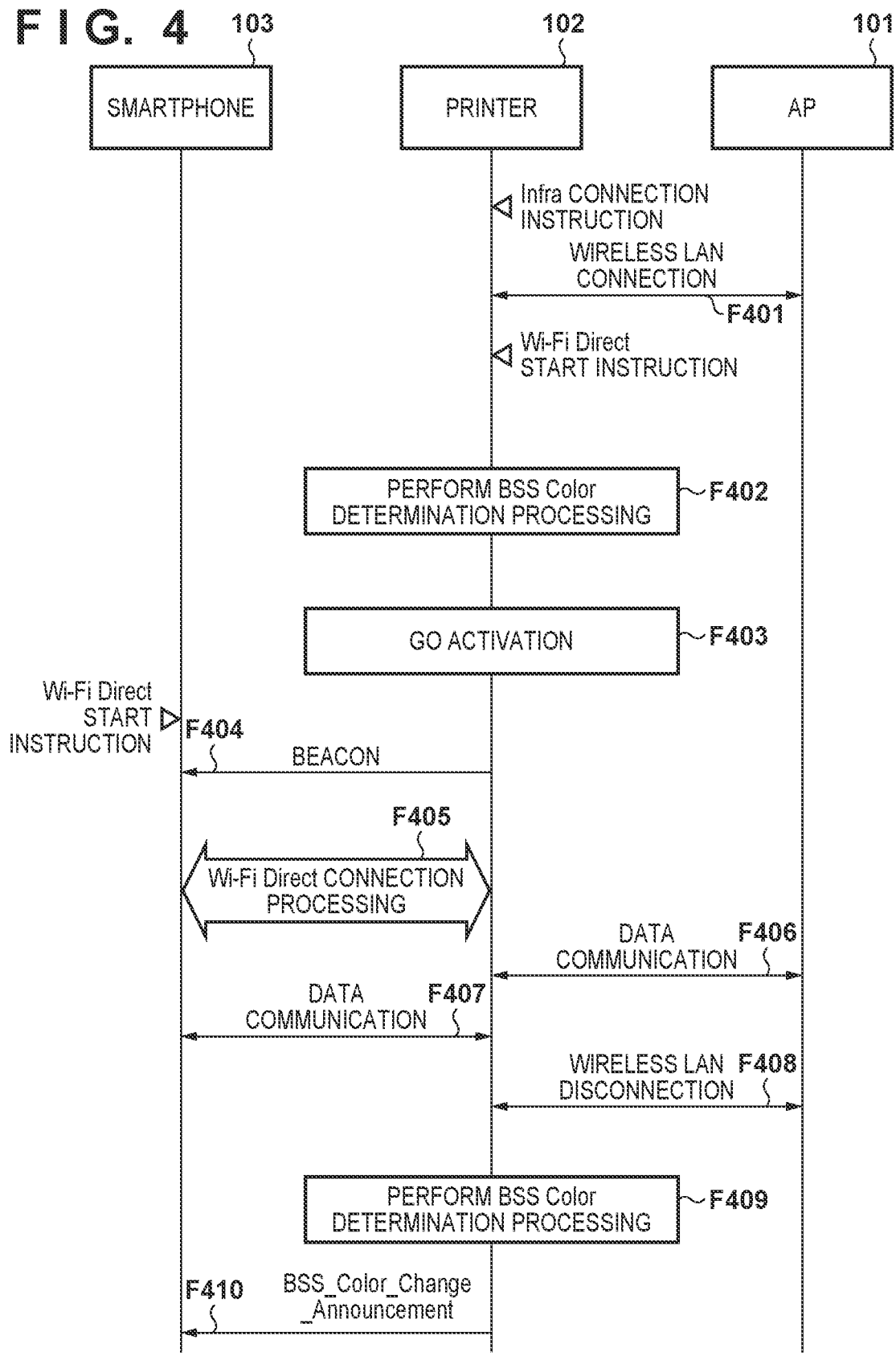
FIG. 4 is a sequence chart showing a communication sequence according to the first embodiment.

FIG. 4 is a sequence chart showing a communication sequence according to the first embodiment. This sequence starts when the printer 102 accepts an infrastructure connection instruction from the user via the operation unit 203.

After accepting the infrastructure connection instruction, the printer 102 performs wireless LAN connection to the AP 101 in the infrastructure mode (F401). Connection to the AP 101 may be performed by inputting the wireless LAN parameters (an SSID, a passphrase, and the like) of the AP 101 via the operation unit 203 of the printer 102. Alternatively, connection to the AP 101 may be performed using a protocol that automatically sets parameters, such as WPS (Wi-Fi Protected Setup) or DPP (Device Provisioning Protocol). The present invention, however, is not limited to them.

The wireless network 104 established by the AP 101 is a wireless network complying with 802.11ax, and is in a state in which the SR processing is enabled. A BSS color is used as information for identifying a BSS, and "Color1" is used as a BSS color value in the wireless network 104. Although it is assumed that BSS color information is included in the physical layer header of a wireless frame to be transmitted by the AP 101 and then transmitted, details will be described later.

By receiving the wireless frame transmitted by the AP 101 in the process of performing connection to the AP 101, the printer 102 can identify that the BSS color of the wireless network 104 established by the AP 101 is "Color1". After the printer 102 is connected to the wireless network 104 established by the AP 101, when the self-apparatus transmits a wireless frame to the wireless network 104, it transmits a predetermined wireless frame by including "Color1" in it. This allows the AP 101 to identify that the wireless frame is a wireless frame belonging to the wireless network 104. Assume here that the printer 102 stores "Color1" as the BSS color value of the connected AP 101 in the storage unit 207.

Subsequently, after completion of connection to the AP 101, the printer 102 receives a Wi-Fi Direct start instruction from the user via the operation unit 203. Assume here that since the printer 102 is in a state in which it is already connected to the AP 101 in the infrastructure mode at the time of receiving the Wi-Fi Direct start instruction, the printer 102 operates as a GO and determines to perform a concurrent operation. That is, the printer 102 is activated as a GO in an autonomous GO mode of Wi-Fi Direct. The autonomous GO mode is a mode of autonomously activating the apparatus as a GO by skipping processing (GO (Group Owner) negotiation processing) of deciding a role (GO or client) in Direct with the counter apparatus.

If the printer 102 determines to be activated as a GO, it serves as a GO to establish the wireless network 105 which complies with 802.11ax and in which the SR processing is enabled. Note that the wireless channel of the wireless network 105 established by the printer 102 as a GO is the same as that of the wireless network 104 established by the AP 101.

The printer 102 performs processing of determining the BSS color of the wireless network 105 established by itself as a GO (F402). In this example, the printer 102 determines to establish, as a GO, the wireless network 105 using "Color1" that is the same value as the BSS color value of the wireless network 104 established by the AP 101. Note that details of the determination processing will be described later. The printer 102 is activated as a GO, and establishes the wireless network 105 (F403).

Subsequently, the smartphone 103 receives a Wi-Fi Direct start instruction from the user via the operation unit 302. After receiving the Wi-Fi Direct start instruction, the smartphone 103 performs Wi-Fi Direct terminal search processing. The printer 102 serves as a GO to establish the wireless network 105, and is in a state in which it transmits a beacon (F404).

The smartphone 103 receives the beacon in the search processing. Alternatively, the smartphone 103 transmits a Probe_Request packet including a Wi-Fi Direct information element (IE), and receives, from the printer 102, a Probe_Response packet transmitted as a response to the Probe_Request packet. The Probe_Response packet includes the Wi-Fi Direct IE. The smartphone 103 can detect, by the search processing, that the printer 102 operates as a GO. The smartphone, 103 displays, on the display unit 303, a list of Wi-Fi Direct terminals found by the search processing, selects a connection destination by user selection, and is connected to it. Assume here that the printer 102 is selected as a connection destination. After that, connection processing by Wi-Fi Direct is performed between the printer 102 and the smartphone 103 (F405).

Upon completion of the connection processing, the printer 102 and the AP 101 can perform data communication via the wireless network 104 (F406). Similarly, the printer 102 and the smartphone 103 can perform data communication via the wireless network 105 (F407). At this time, since the wireless networks 104 and 105 use the same BSS color, the SR processing is not applied to packets transmitted in these wireless networks. After that, upon completion of data communication with the AP 101, the printer 102 disconnects the wireless LAN connection from the AP 101 (F408).

The printer 102 performs BSS color determination processing using, as a trigger, disconnection from the AP 101 (F409). In this BSS color determination processing, whether to change the BSS color is determined. Since the wireless LAN connection is disconnected from the AP 101, the printer 102 transmits no data to the wireless network 104. That is, the printer 102 is in a state in which a signal transmitted to the wireless network 104 does not collide with a signal received in the wireless network 105. In this state, in consideration of efficient use of wireless media, the SR processing is desirably used in each wireless network. Therefore, it is preferable to use different BSS colors in the wireless networks 104 and 105. To achieve this, the printer 102 determines to establish the wireless network 105 using a BSS color different from that of the wireless network 104. Assume here that the printer 102 establishes the wireless network 105 using "Color2" as a BSS color value. If the printer 102 performs reconnection processing to the AP 101 in the infrastructure mode, it determines not to change the BSS color. The case in which the reconnection processing is performed indicates a case in which the infrastructure connection is disconnected against the intention of the printer 102, for example, a case in which the beacon of the AP 101 cannot be obtained. If reconnection is performed in the infrastructure mode, BSS color change processing (to be described later) is not performed by maintaining the same BSS color as that of the AP 101, resulting in high processing efficiency.

If it is determined to change the BSS color, the printer 102 performs processing of changing the BSS color value of the wireless network 105 from "Color1" to "Color2". When changing the BSS color value, the printer 102 as the GO of the wireless network 105 transmits a wireless frame including a BSS_Color_Change_Announcement element to the smartphone 103 as a client (F410). Details of the wireless frame will be described later.

The printer 102 notifies the smartphone 103 that the BSS color of the wireless network 105 is to be changed, and then changes the BSS color of the wireless network 105.

Figure 5:
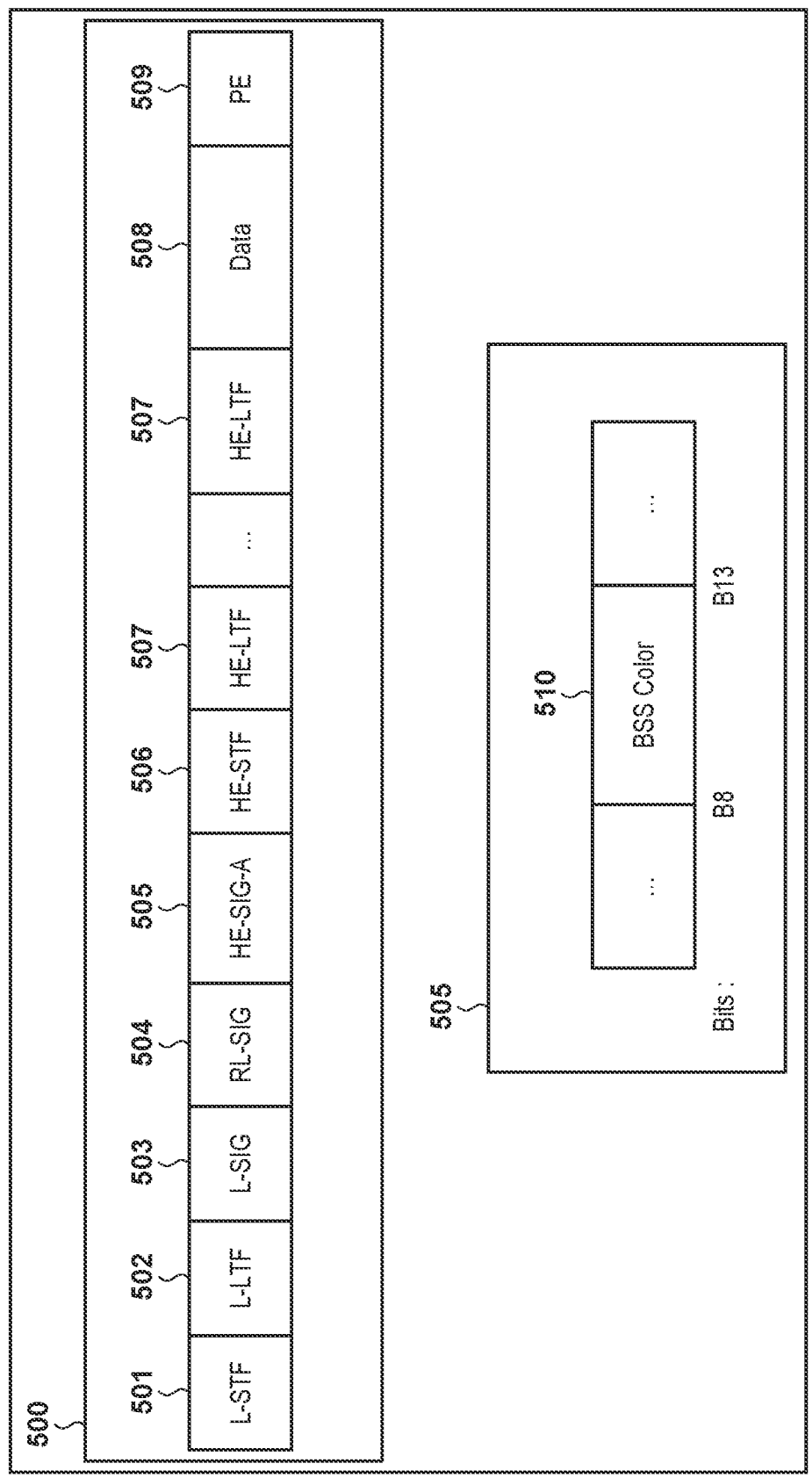
FIG. 5 is a view showing an example of a frame format in a PHY layer.

FIG. 5 is a view showing an example of a frame format in a PHY layer. More specifically, FIG. 5 shows an HE_SU_PPDU (High Efficiency Single User PLCP Packet Data Unit) frame as a kind of physical layer frame in 802.11ax. As will be described later, the HE_SU_PPDU frame includes BSS color information. An HE_SU_PPDU frame 500 includes fields for a legacy terminal (HE-incompatible terminal), fields for an HE-compatible terminal, a data payload portion 508, and a PE (Packet Extension) field 509.

More specifically, an L-STF (Legacy Short Training Field) field 501, an L-LTF (Legacy Long Training Field) field 502, and an L-SIG (Legacy Signal) field 503 are included. Furthermore, an RL-SIG (Repeated Legacy Signal) field 504 as a repetition symbol of the L-SIG field is included. The RL-SIG field 504 can be used to distinguish whether the format is a format for an HE-compatible terminal. Furthermore, an HE-SIG-A (High Efficiency Signal-A) field 505, an HE-STF (High Efficiency Short Training Field) field 506, and an HE-LTF (High Efficiency Long Training Field) field 507 are included.

The HE-SIG-A field 505 is formed from a plurality of fields, and is formed by an HE-SIG-A1 field and an HE-SIG-A2 field in the HE_SU_PPDU format. The HE-SIG-A1 field includes a BSS_Color field 510 as a field for identifying the BSS color information. The BSS_Color field is a 6-bit information element, and can take a value from 0 to 63.

Note that the above-described format is merely an example, and the HE_PPDU-related format is formed by a format complying with 802.11ax.

FIG. 6 is a view showing an example of the format of the information element (IE) associated with the BSS color. More specifically, FIG. 6 shows the format of an HE_Operation element. The BSS color information is included in a MAC frame and transmitted/received, thereby making it possible to perform control associated with the BSS color That is, by adding the HE_Operation element to a predetermined MAC frame, it is possible to perform high efficiency control of the STA apparatus in the BSS.

The HE_Operation element is formed from a plurality of fields. An Element_ID field 601, a Length field 602, and an Element_ID_Extension field 603 are fields including basic information for identifying data of the information element. An HE_Operation_Parameters field 604 includes parameters necessary for high efficiency processing. A BSS_Color_Information field 605 includes information concerning the BSS color. A VHT (Very High Throughput)_Operation_Information field 607 includes information for making a notification of the presence/absence of information concerning VHT processing (high speed transmission processing). A MAX_Co-Located_BSSID_Indicator field 608 includes information associated with the maximum number of coexisting BSSs. The coexisting BSSs indicate a plurality of BSSs that operate using the same wireless channel and the same frequency band by, for example, sharing the same antenna connector.

The BSS_Color_Information field 605 is formed from a plurality of subfields. A BSS_Color subfield 609 includes identification information of the BSS color. A Partial_BSS_Color subfield 610 includes information indicating whether an AID (Association IDentifier) assignment rule based on the BSS color is applied to the BSS. An AID is an identifier assigned by the AP for distinguishing a connected terminal. A BSS_Color_Disabled subfield 611 can be used to indicate that the use of the BSS color is temporarily stopped when, for example, the HE-compatible terminal detects duplication of the BSS color.

This is merely an example, and a format complying with the 802.11ax specification is used as the MAC frame format associated with the BSS color.

Figure 7:
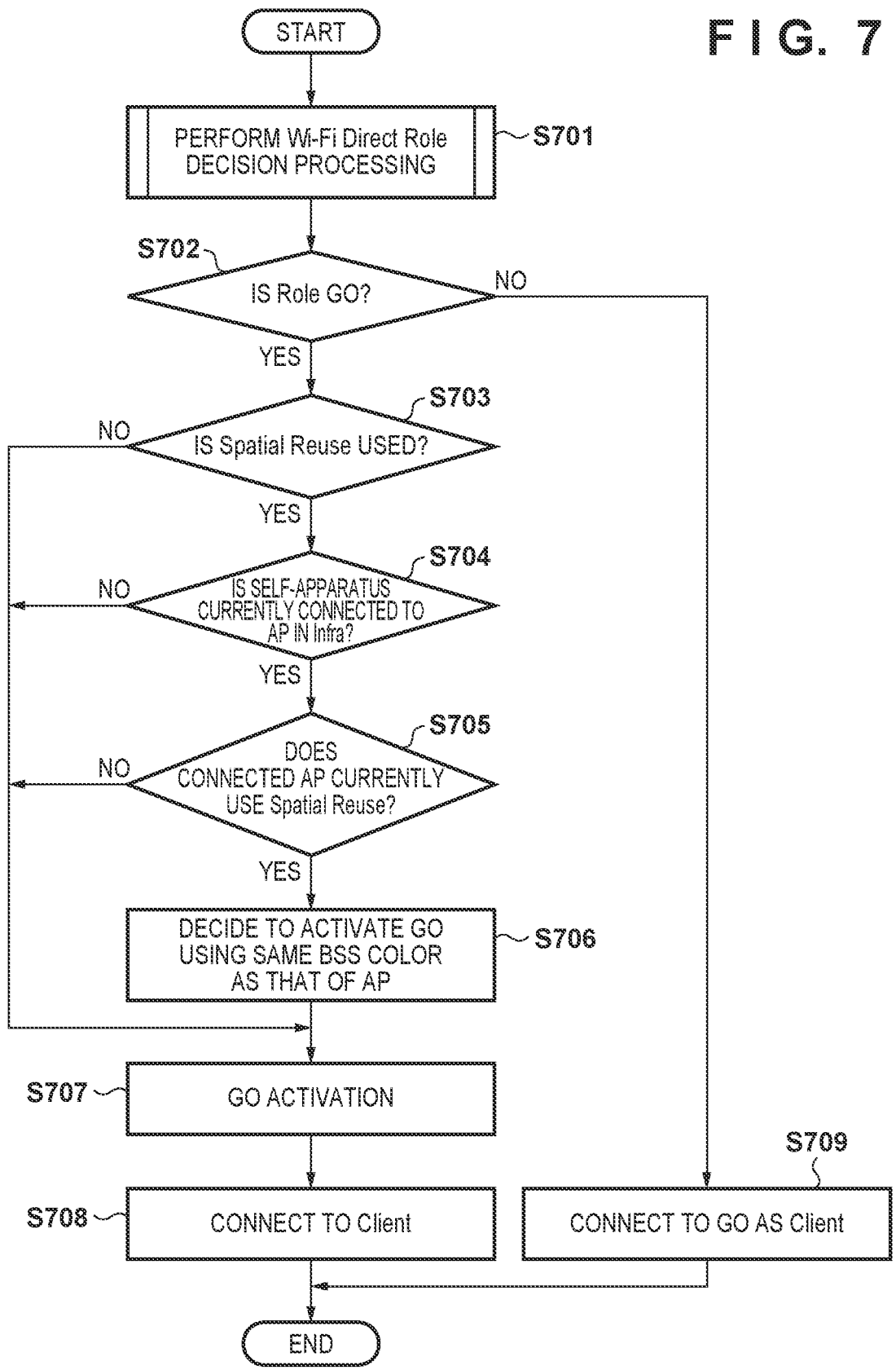
FIG. 7 is a flowchart illustrating an operation when starting Wi-Fi Direct connection in the printer.

FIG. 7 is a flowchart illustrating an operation when starting Wi-Fi Direct connection in the printer. A description will be provided by assuming that the operation is processed at a timing when the printer 102 receives a Wi-Fi Direct start instruction in FIG. 4 but the present invention is not limited to this. For example, the operation may be performed when it is determined by a program or the like to start. Wi-Fi Direct connection.

In step S701, the printer 102 performs processing of deciding the role of the self-apparatus in Wi-Fi Direct. More specifically, the printer 102 may perform GO negotiation processing in Wi-Fi Direct with a counter apparatus, and then decide the role. Alternatively, the printer 102 may decide to be activated in the above-described autonomous GO mode (the role is a GO). In this case, for example, the printer 102 determines whether it is currently connected to the AP in the infrastructure mode, and decides, if it is currently connected to the AP, to be activated in the autonomous GO mode. On the other hand, if the printer 102 is not currently connected to the AP, it performs GO negotiation processing in Wi-Fi Direct with the counter apparatus, and decides the role. Alternatively, the printer 102 may prompt the user to select the role via a UI (for example, the operation unit 203), and the present invention is not limited to this.

In step S702, the printer 102 determines whether the role of the self-apparatus decided in the role decision processing is a GO. If the role is a GO, the process advances to step S703. If the role is a client, the process advances to step S709.

In step S703, the printer 102 determines whether to use the SR processing in the wireless network 105 established by the self-apparatus as a GO. Whether to use the SR processing may be determined by a program. For example, the determination processing is performed by a program based on information indicating, for example, whether the counter apparatus connected by Wi-Fi Direct complies with 802.11ax or whether the SR processing is enabled. Whether the SR processing is enabled is determined based on parameters associated with the SR processing included in the physical header of a wireless frame transmitted by the counter apparatus. Alternatively, information indicating whether the SR processing is enabled may be added as an extension element to a wireless frame such as an Action frame associated with Wi-Fi Direct. This makes it possible to determine whether the counter apparatus enables the SR processing in the Wi-Fi Direct connection processing, by transmitting/receiving the Action frame associated with Wi-Fi Direct.

These pieces of information may be obtained in the GO negotiation processing when the processing is performed with the counter apparatus. For example, if it is determined that the counter apparatus complies with 802.11ax and enables the SR processing, it is determined to use the SR processing. Note that the user may be prompted to make a setting via the UI using the operation unit 203. Any method that can determine whether to use the SR processing may be used and the present invention is not limited to this. If it is determined to use the SR processing, the process advances to step S704; otherwise, the process advances to step S707.

In step S704, the printer 102 determines whether the self-apparatus is currently connected to the AP in the infrastructure mode. If the self-apparatus is currently connected to the AP, the process advances to step S705; otherwise, the process advances to step S707. The determination processing may be performed not only based on whether the self-apparatus is currently connected to the AP but also based on whether connection processing to the AP is currently performed. For example, if the self-apparatus is not currently connected to the AP but currently performs the connection processing to the target AP, the process may advance to step S705.

In step S705, the printer 102 determines whether the currently connected AP (or connection destination AP) currently uses the SR processing. Whether the connection destination AP currently uses the SR processing can be determined by receiving a wireless frame transmitted from the AP and using information included in the frame. If the connection destination AP currently uses the SR processing, the process advances to step S706; otherwise, the process advances to step S707. Note that if the connection destination AP does not currently use the SR processing, an arbitrary value is used as the BSS color of the wireless network 105 established by the printer 102 as a GO. Alternatively, a BSS color value different from the BSS color value of a peripheral wireless network may be used. The BSS color of the peripheral wireless network is obtained from a BSS color included in the physical layer header of the wireless frame of a received beacon which is transmitted by an apparatus operating as an 802.11ax base station. Alternatively, the printer 102 may transmit a Probe_Request packet, receive a Probe_Response packet as a response, and then obtain a BSS color included in the physical layer header of the Probe_Response packet. A BSS color obtaining method is not limited to them.

In step S706, the printer 102 decides to establish, as a GO, the wireless network 105 using the same BSS color as that of the connection destination AP. Note that the BSS color of the connection destination AP can be obtained from the information included in the wireless frame transmitted by the AP, as described above. In this example, the printer 102 decides to establish the wireless network 105 using "Color1" as the BSS color of the wireless network 104 established by the AP 101.

In step S707, the printer 102 performs GO activation processing. When the printer 102 is activated as a GO, it transmits a beacon and establishes the wireless network 105. At this time, the printer 102 transmits the beacon by including the BSS color of "Color1" in the PHY header of the beacon. In addition to the beacon, the wireless frame such as the Probe_Response packet transmitted by the printer 102 is transmitted by including the BSS color in its PHY header. In addition to the PHY header, the above-described HE_Operation element including the BSS color value may be added to the MAC frame and transmitted. In step S708, the printer 102 performs connection processing to the client of the counter apparatus in the wireless network 105 established by the self-apparatus as a GO. Upon completion of the connection processing, the printer 102 starts Wi-Fi Direct communication with the client of the counter apparatus.

On the other hand, if it is determined in step S702 that the self-apparatus operates as a client, the printer 102 operates as a client and performs connection processing to the GO of the counter apparatus in step S709, thereby starting Wi-Fi Direct communication. Note that if the self-apparatus operates as a client, it obtains a BSS color included in a wireless frame transmitted by the GO of the counter apparatus, adds the same BSS color to a wireless frame to be transmitted by itself, and transmits the wireless frame. The BSS color is included in the PITY header and transmitted. In addition, the HE_Operation element including the BSS color value may be added to the MAC frame and the MAC frame may be transmitted.

Figure 8:
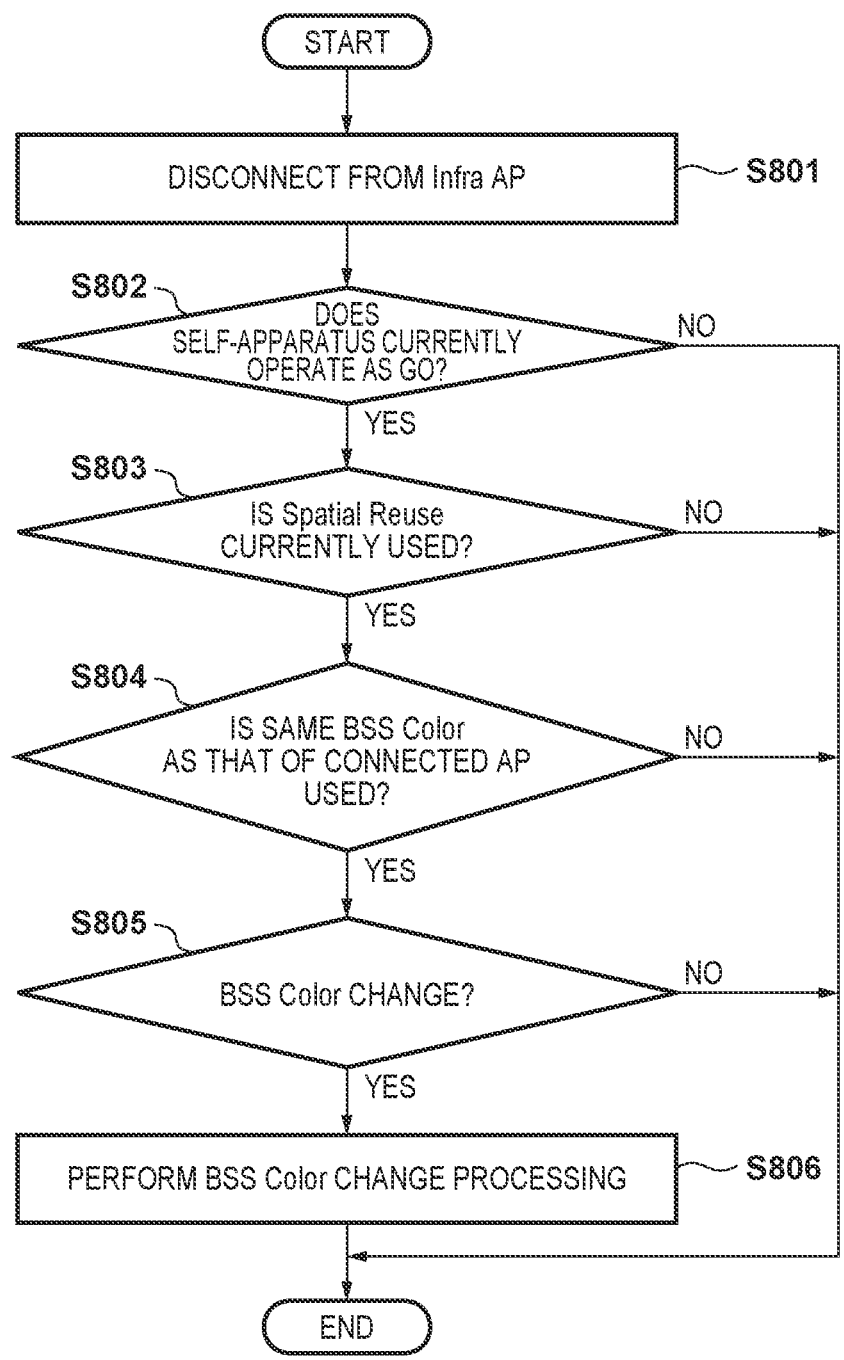
FIG. 8 is a flowchart illustrating an operation when stopping infrastructure connection in the printer.

FIG. 8 is a flowchart illustrating an operation when stopping infrastructure connection in the printer. Infrastructure connection stop processing may start based on a user instruction or autonomously start by determination by a program. For example, if the beacon of the counter AP cannot be obtained or a disconnection packet (Deauthentication frame or the like) is explicitly received from the AP, the infrastructure connection stop processing starts. Assume here that the printer 102 performs the infrastructure connection stop processing at the time of wireless LAN disconnection (F408) in FIG. 4.

In step S801, the printer 102 performs disconnection processing from the AP currently connected in the infrastructure mode. For example, disconnection can be performed by transmitting a Disassociation frame to the AP. Note that the disconnection processing is not limited to this. The disconnection processing may be performed when the beacon cannot be received from the AP or the AP explicitly performs disconnection by a Deauthentication frame, as described above, and the present invention is not limited to this. Upon completion of disconnection from the AP, the process advances to step S802.

In step S802, the printer 102 determines whether the self-apparatus currently operates as a GO. If the self-apparatus currently operates as a GO, the process advances to step S803; otherwise, the infrastructure connection stop processing ends.

In step S803, the printer 102 determines whether the SR processing is currently used in the wireless network 105 established by itself as a GO. If the SR processing is currently used, the process advances to step S804; otherwise, the infrastructure connection stop processing ends.

In step S804, the printer 102 determines whether the same BSS color value as that of the wireless network 104 of the AP connected in the infrastructure mode is used as the BSS color value of the wireless network 105 established by the printer 102 as a GO. If the same BSS color value is used, the process advances to step S805; otherwise, the infrastructure connection stop processing ends.

In step S805, the printer 102 determines whether to change the BSS color of the wireless network 105 established by the itself as a GO. This determination processing is performed in consideration of efficient use of wireless media between the wireless networks 104 and 105, as described above in the explanation of the processing in F409. If it is determined to change the BSS color of the wireless network 105, the process advances to step S806; otherwise, the infrastructure connection stop processing ends.

In step S806, the printer 102 performs the change processing of the BSS color of the wireless network 105. In the BSS color change processing, the printer 102 notifies the client currently connected to the wireless network 105 that the BSS color is to be changed. For example, the printer 102 can make a notification using a wireless frame (a frame including a BSS_Color_Change_Announcement element) (to be described later). After making the BSS color change notification to the client, the BSS color of the wireless network 105 established by the printer 102 as a GO is changed, and more detailed processing will be described later. In this example, the BSS color of the wireless network 105 is changed from "Color1" to "Color2". After changing the BSS color, the infrastructure connection stop processing ends.

Figure 9:
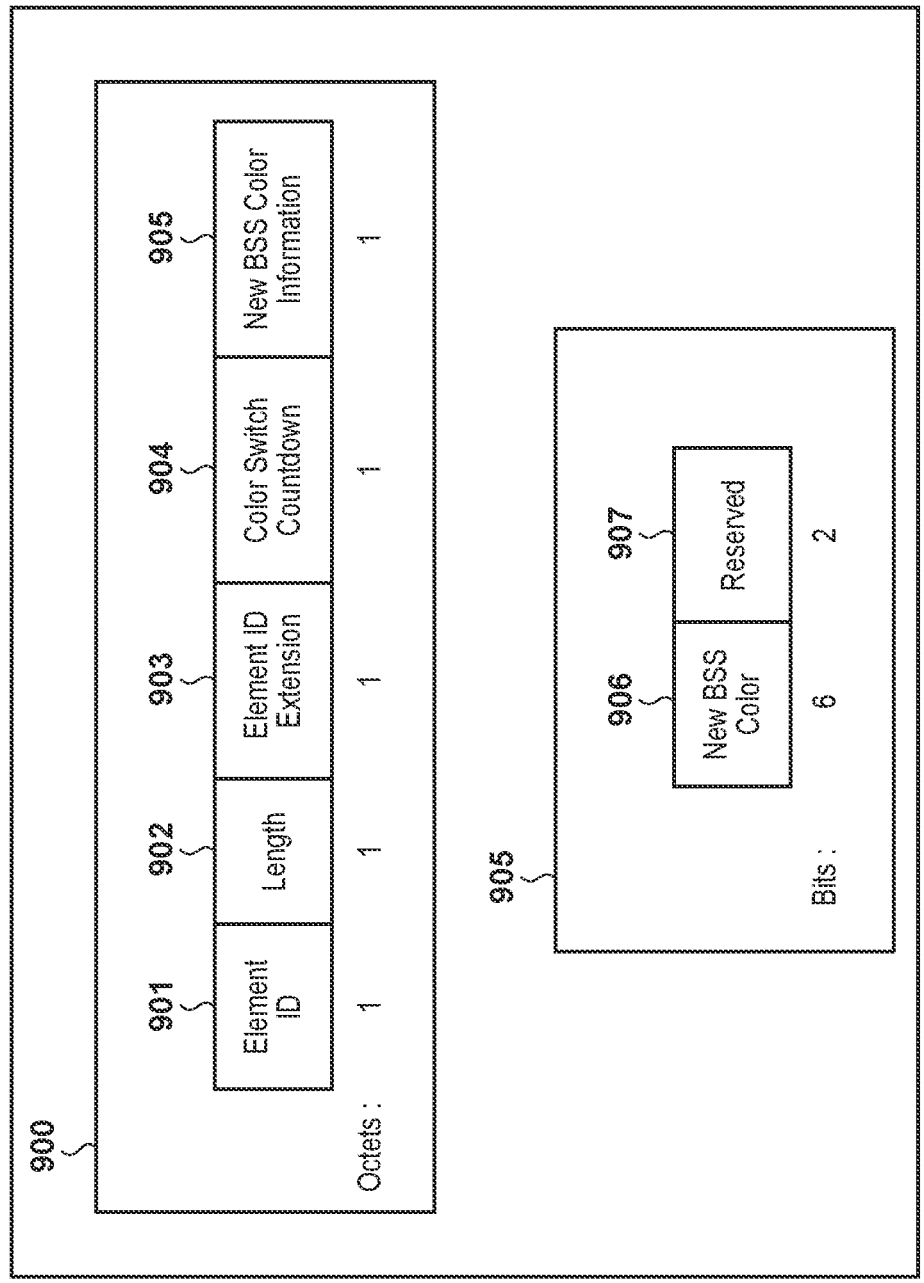
FIG. 9 is a view showing an example of the format of a BSS color change notification.

FIG. 9 is a view showing an example of the format of the BSS color change notification. More specifically, FIG. 9 shows the format of the BSS_Color_Change_Announcement element. A BSS_Color_Change_Announcement element 900 is added, as an IE (Information Element), to a predetermined wireless frame in a wireless LAN, and the wireless frame is transmitted/received.

An Element JD field 901, a Length field 902, and an Element_ID_Extension field 903 are fields including basic information for identifying data of the information element. A Color_Switch_Countdown field 904 includes the value of a time until the BSS color is changed, and a notification that the BSS color is changed is made when the value becomes "0". A New_BSS_Color_Information field 905 includes information of the changed BSS color.

The New_BSS_Color_Information field 905 is formed from a plurality of subfields. A New_BSS_Color subfield 906 includes the value of the changed BSS color. By using the BSS_Color_Change_Announcement element, it is possible to notify the terminal that the BSS color of the wireless network established by the self-apparatus is to be changed in a predetermined time.

As described above, according to the first embodiment, when the printer 102 performs a concurrent operation, the BSS color of the wireless network 105 established in the base station mode (by the Wi-Fi Direct GO) is controlled. More specifically, the wireless network 105 is established using the same BSS color as that of the wireless network 104 connected in the terminal mode (by the STA in the infrastructure mode). This can reduce the occurrence of signal collision between these wireless networks.

Note that in the above description, the sequence of activating the printer 102 as a Wi-Fi Direct GO after the printer 102 is connected, as an STA in the infrastructure mode, to the AP 101 has been described as the concurrent operation of the printer 102. The present invention, however, is not limited to this. A sequence of connecting, to the AP 101, the printer 102 as an STA in the infrastructure mode in a state in which the printer 102 is activated as a Wi-Fi Direct GO in advance is similarly applicable.

In this case, when connecting, to the AP 101, the printer 102 as an STA in the infrastructure mode, in a state in which the printer 102 serves as a GO to establish the wireless network 105 using a predetermined BSS color, the BSS color of the wireless network 104 is obtained. If the wireless networks 105 and 104 use the same wireless channel and different BSS colors, processing of changing the BSS color value of the wireless network 105 to the same BSS color value as that of the wireless network 104 is performed. As BSS color change processing, BSS color change processing using the BSS_Color_Change_Announcement element can be applied, similar to step S806 described above. Note that if the wireless networks 104 and 105 operate using different wireless channels, the active GO may temporarily be stopped, and the wireless network 105 may be established using the same wireless channel as that of the wireless network 104, thereby applying the above-described processing.

Before the BSS color change processing in step S806 described above, it may be determined whether the printer 102 and the smartphone 103 currently perform data communication. If data communication is currently performed, the BSS color change processing may be performed after completion of the data communication. In this case, after completion of the data communication, a frame including the BSS_Color_Change_Announcement element is transmitted. A value calculated from the estimated data communication completion time may be included in the Color_Switch_Countdown field 904 included in the BSS_Color_Change_Announcement element, and transmitted.

The above description has explained a form of changing the BSS color value included in the predetermined wireless frame when setting the BSS color value of the wireless network 105 to the same value as that of the wireless network 104. In addition, the parameters of the field included in the predetermined wireless frame may be changed so as to understand that the wireless network 105 established by the printer 102 as a GO is the same type of BSS as that of the wireless network 104. For example, the value of a Co-Located_BSS subfield (not shown) in the HE_Operation_Parameters field 604 included in the HE_Operation element shown in FIG. 6 is changed. The Co-Located_BSS subfield is a field indicating whether the same antenna connector, the same wireless channel, and the like are shared with another BSS. By making, by the Co-Located_BSS subfield, a notification that the same antenna connector, the same wireless channel, and the like are shared with another BSS, a notification that the wireless network 105 is the same type of BSS as that of another network may be made. The value of the MAX_Co-Located_BSSID_indicator field 608 max be set to make a notification. Note that these are merely examples, and the printer 102 may perform all processes complying with 802.11ax so that the wireless network 105 established by the printer 102 as a GO behaves as Co-Located_BSSID of the wireless network 104 of the AP 101. Alternatively, only some of the processes may be performed.

Furthermore, before the determination processing in step S706 described above, another determination processing may be performed. For example, the distance between the AP 101 and the printer 102 may be measured and it may be determined whether the distance satisfies a predetermined condition. Alternatively, the signal strength received from the wireless network 104 of the AP 101 may be measured and it may be determined whether the received signal strength satisfies a predetermined condition. The distance can be measured by performing transmission/reception using predetermined wireless frames.

The predetermined condition is, for example, that the distance between the AP 101 and the printer 102 is longer than a predetermined distance or that the received signal strength is smaller than a threshold. If the condition is satisfied, it is considered that the probability of collision or interference between a signal transmitted/received in the wireless network 105 and that transmitted/received in the wireless network 104 is low. Therefore, if the condition is satisfied, the printer 102 may determine, as the BSS color value of the wireless network 105, a value different from the BSS color value of the wireless network 104. In this case, it is possible to effectively use the SR processing between the wireless networks 104 and 105.

Second Embodiment

The second embodiment will describe a case in which one more AP complying with 802.11ax exists and establishes a wireless network using the same BSS color with respect to the first embodiment (FIG. 1).

System Configuration

Figure 10:
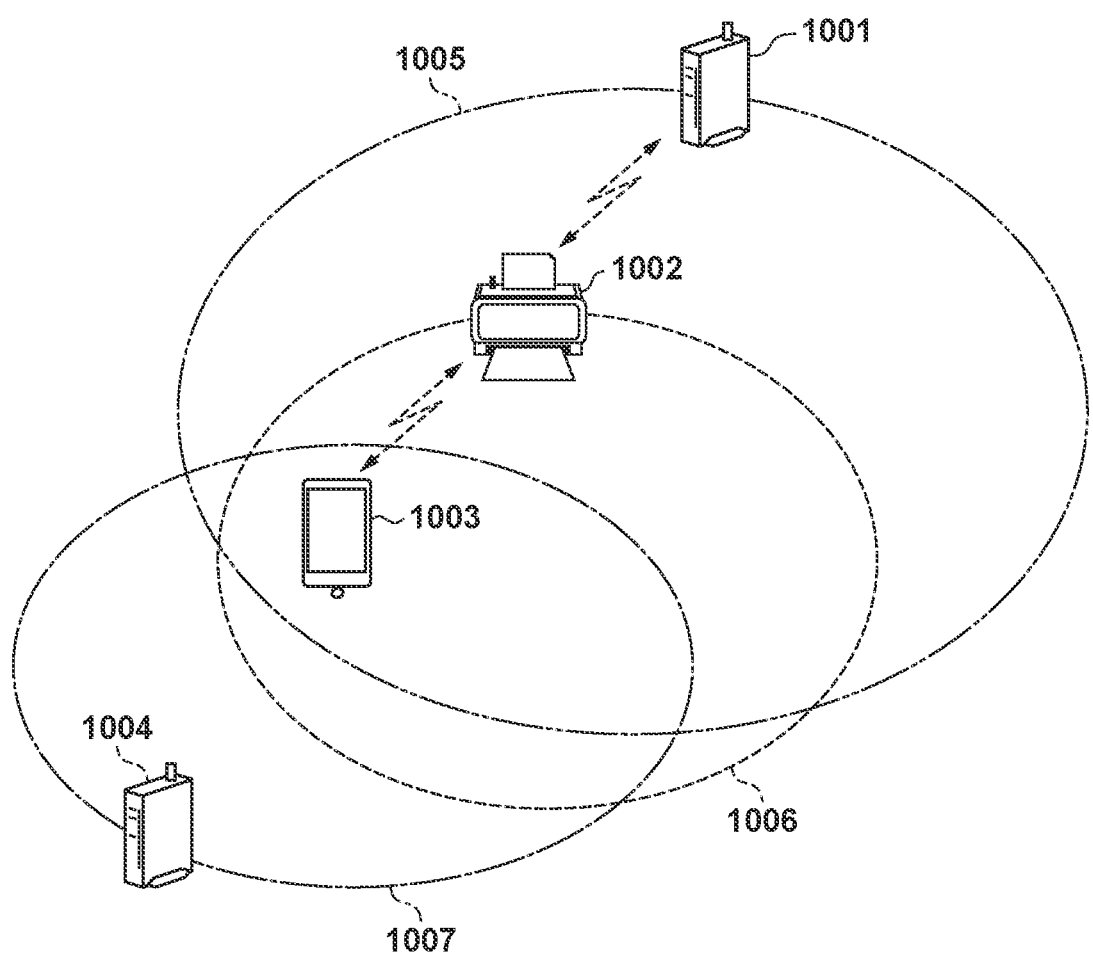
FIG. 10 is a view showing the configuration of a communication system according to the second embodiment.

FIG. 10 is a view showing the configuration of a communication system according to the second embodiment. An AP 1001, a printer 1002, and a smartphone 1003 are the same apparatuses as the AP 101, the printer 102, and the smartphone 103 in the first embodiment, respectively. Wireless networks 1005 and 1006 are the same wireless networks as the wireless networks 104 and 105 in the first embodiment, respectively.

An AP 1004 is the second AP different from the AP 1001. The function of the AP 1004 is the same as that of the AP 1001. That is, wireless LAN communication complying with 802.11ax is possible and the SR processing is enabled. A wireless network 1007 is a wireless network established by the AP 1004. Assume here that all the wireless networks 1005, 1006, and 1007 are established on the same wireless channel.

The AP 1001 and the printer 1002 are connected to each other in the infrastructure mode in the wireless network 1005, and the printer 1002 operates as an STA. The printer 1002 and the smartphone 1003 are connected to each other by Wi-Fi Direct in the wireless network 1006, and the printer 1002 operates as a GO. Then, the smartphone 1003 operates as a client. The wireless networks 1005 and 1006 are established using "Color1" as the same BSS color value. Furthermore, the BSS color value of the wireless network 1007 established by the AP 1004 is also "Color1".

A case in which in the above-described state, the smartphone 1003 receives a signal for the wireless network 1007 established by the AP 1004 will be described below.

Operation of System

Figure 11:
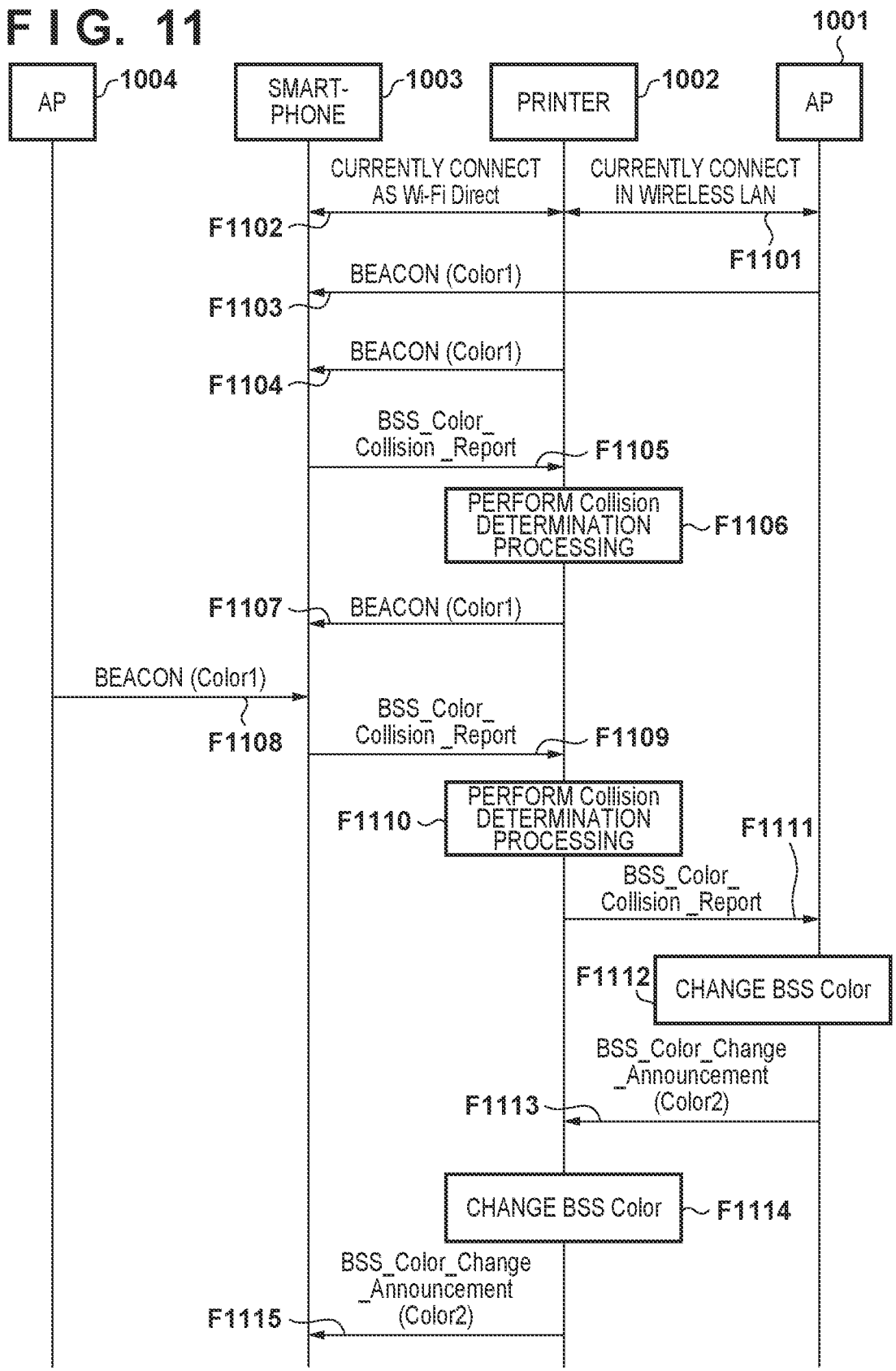
FIG. 11 is a sequence chart showing a communication sequence according to the second embodiment.

FIG. 11 is a sequence chart showing a communication sequence according to the second embodiment. As described above, the printer 1002 is currently connected to the AP 1001 in the wireless LAN infrastructure mode (F1101). The printer 1002 operates as a Wi-Fi Direct GO, and the smartphone 1003 is currently connected, as a Wi-Fi Direct client, to the printer 1002 (F1102).

Therefore, the AP 1001 periodically transmits a beacon including BSS color information of "Color1" (F1103). In addition, the printer 1002 periodically transmits a beacon including BSS color information of "Color1" (F1104). Thus, the smartphone 1003 receives both the beacons of the wireless networks 1005 and 1006.

In the 802.11ax specification, a mechanism has been examined, in which if an apparatus operating as an STA receives signals of the same BSS color value from different BSSs, the currently connected AP is notified of BSS color collision. The STA apparatus can set whether to enable a BSS color collision detection function, if the BSS color collision detection function is enabled, when collision is detected, the STA apparatus notifies the currently connected AP of a wireless frame including a BSS_Color_Collision- _Report. The AP is notified of the wireless frame included in an Event_Report element of an Event_Report frame format.

The BSS_Color_Collision_Report is information for making it possible to select a BSS color value other than that currently used by another BSS when the connection destination AP changes the BSS color value. More specifically, a value that can be taken by a BSS color is defined by a bitmap, and the value in which a target bit of the BSS color value used by a peripheral AP and detected by the STA apparatus is set is included in information.

Upon receiving the BSS_Color_Collision_Report, the AP can determine whether to change the BSS color, and perform processing to change the BSS color value to a value other than the notified BSS color value.

Upon receiving the beacons in F1103 and F1104, the smartphone 1003 detects BSS color collision, and transmits the BSS_Color_Collision_Report. In this example, since the smartphone 1003 is connected, as a client, to the printer 1002 operating as a GO, it transmits the BSS_Color_Collision_Report to the printer 1002 (F1105).

Upon receiving the BSS_Color_Collision_Report, the printer 1002 performs collision determination processing (F1106). The collision determination processing is executed in accordance with a flowchart shown in FIG. 12 (to be described later). In this example, the printer 1002 determines that a collision detection between the wireless network 1006 established by the self-apparatus as a GO and the wireless network 1005 to which the self-apparatus is currently connected in the infrastructure mode has been reported. As described above, since the printer 1002 actively sets the same BSS color value as that of the wireless network 1005, it neglect ignores the BSS_Color_Collision_Report notified here, and does not particularly perform any processing.

Subsequently, the smartphone 1003 receives the beacon including "Color1" from the printer 1002 (F1107). Then, the smartphone 1003 also receives the beacon including "Color1" from the AP 1004 (F1108). In this case, as described above, the smartphone 1003 detects BSS color collision, and transmits the BSS_Color_Collsion_Report to the currently connected printer 1002 as a GO (F1109).

Upon receiving the BSS_Color_Collision_Report, the printer 1002 performs collision determination processing (F1110). In this example, it is determined that the wireless network in which BS color collision occurs is the wireless network 1007 different from the wireless network 1005 established by the AP 1001. Details of the processing will be described later with reference to FIG. 12.

Since the collision is not collision with the wireless network 1005 to which the self-apparatus is connected as an STA, the smartphone 1003 notifies the AP 1001 that there is another wireless network of the same BSS color in the periphery. More specifically, the printer 1002 transmits the wireless frame including the BSS_Color_Collision_Report to the AP 1001 (F1111). This processing is performed for the purpose of prompting the AP 1001 to change the BSS color so as to more efficiently use the SR processing in both the wireless networks to which the self-apparatus is concurrently connected.

Upon receiving the BSS_Color_Collision_Report, the AP 1001 determines to change the BSS color (F1112). The AP 1001 transmits, to the printer 1002, the wireless frame including the BSS_Color_Change_Announcement element to change the BSS color (F1113). Assume here that the changed BSS color value is "Color2".

Upon receiving the BSS_Color_Change_Announcement element, the printer 1002 recognizes that the BSS color of the AP 1001 is changed. Since the printer 1002 currently performs the concurrent operation, it determines to change the BSS color value of the wireless network 1006 to the same value as that of the wireless network 1005 of the AP 1001, similar to the first embodiment, That is, the printer 1002 determines to change the BSS color to "Color2" in the wireless network 1005 on the GO side, and performs BSS color change processing (F1114). In the wireless network 1005, the printer 1002 transmits, to the smartphone 1003, the wireless frame including the BSS_Color_Change_Announcement element to change the BSS color value, and then changes the BSS color (F1115).

Figure 12:
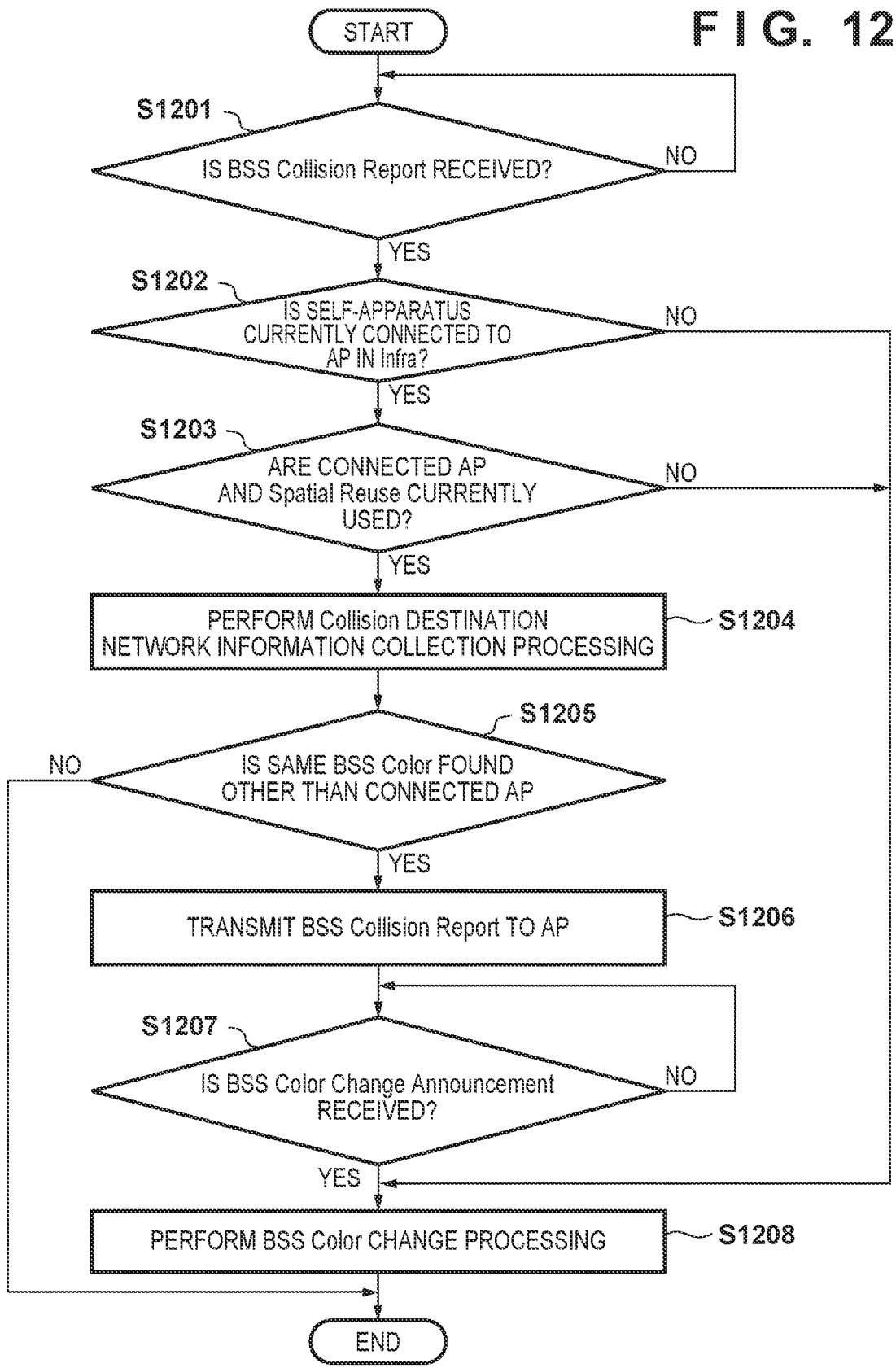
FIG. 12 is a flowchart illustrating an operation when receiving a BSS_Color_Collision_Report in a printer.

FIG. 12 is a flowchart illustrating an operation when the printer receives the BSS_Color_Collision_Report.

In step S1201, the printer 1002 confirms whether it receives the BSS_Color_Collision_Report. If the printer 1002 receives the BSS_Color_Collision_Report, the process advances to step S1202. In step S1202, the printer 1002 determines whether the self-apparatus is currently connected to the AP in the infrastructure mode in the concurrent operation. If the printer 1002 is currently connected to the AP, the process advances to step S1203; otherwise, the process advances to step S1208. In step S1203, the printer 1002 determines whether the SR processing is enabled with the currently connected AP. If the SR processing is enabled, the process advances to step S1204; otherwise, the process advances to step S1208.

In step S1204, the printer 1002 performs processing for collecting information of a BSS color collision destination wireless network. That is, the printer 1002 collects information of a BSS color collision destination network reported by the BSS_Color_Collision_Report. For example, scan processing is performed to search for peripheral wireless networks. In the scan processing, a beacon transmitted by a peripheral base station is received, and a BSS color value included in the PHY header of the wireless frame of the beacon is obtained. Alternatively, a Probe_Request packet may be transmitted, a Probe_Response packet may be received as a response, and a BSS color value included in the PHY header of the wireless frame of the Probe_Response packet may be obtained. Alternatively, a BSS color value included in an information element (HE_Operation element or the like) in a MAC frame received from the base station may be obtained. By performing the scan processing, it is possible to search for peripheral wireless networks, and list wireless networks of the same BSS color value as that of the wireless network 1006. Alternatively, instead of the scan processing, another wireless frame may be used to obtain the BSS color of a peripheral wireless network. Alternatively, information of a collision destination wireless network collected by the smartphone 1003 serving as a client may be obtained via the wireless network 1006. The information of the collision destination wireless network is, for example, an SSID or BSSID, hut the present invention is not limited to them. Any method of determining a BSS color collision destination wireless network may be used.

In step S1205, the printer 1002 determines, based on the collected information, whether the wireless network whose BSS color collides with that of the wireless network 1006 other than the wireless network of the connection destination AP is found. That is, the printer 1002 determines whether there exists a wireless network in which BSS color collision occurs, other than the wireless network 1005 established by the AP 1001. If there exists such wireless network, the process advances to step S1206; otherwise, the notified BSS_Color_Collision_Report is ignored, thereby ending the BSS_Color_Collision_Report reception processing.

In step S1206, the printer 1002 transmits the BSS_Color_Collision_Report to the AP 1001 to which the self-apparatus is connected as an STA. If there exists a wireless network of the same BSS color value other than the wireless networks 1006 and 1005, the probability of signal collision becomes high due to use of the SR processing. Therefore, the printer 1002 transmits the BSS_Color_Collision_Report to prompt the AP 1001 to change the BSS color in order to reduce signal collision.

In step S1207, the printer 1002 waits for reception of the BSS_Color_Change_Announcement element from the AP 1001. Upon receiving the BSS_Color_Change_Announcement element, the printer 1002 changes the BSS color value of the wireless network 1006 to the received BSS color value. Note that if the printer 1002 waits for the BSS_Color_Change_Announcement element for a predetermined period, and then does not receive it, it may determine a time-out, thereby ending the BSS_Color_Collision_Report reception processing. In this case, the BSS color of the wireless network 1006 is not changed.

In step S1208, the printer 1002 performs the BSS color change processing. The BSS color change processing is the same as that in step S806 of the first embodiment and a description thereof will be omitted.

Note that in the above description, the BSS_Color_Collision_Report is transmitted to the AP 1001 in step S1206. However, another determination processing may be performed in advance. For example, the printer 1002 obtains the radio wave reception strength of the collision destination wireless network, and compares the obtained radio wave reception strength with the signal strength of a signal transmitted/received in the wireless network 1006 established by itself as a GO. Then, if the signal strengths are compared and the signal strength received in the wireless network 1006 and that received in the wireless network 1007 are at signal levels at which collision detection is not determined, it is determined that it is unnecessary to change the BSS color of the wireless network 1006. If it is determined that it is unnecessary to change the BSS color, the BSS_Color_Change_Announcement element need not be transmitted to the AP 1001. In this case, the BSS_Color_Collision_Report reception processing ends.

As described above, according to the second embodiment, if there exists a wireless network that uses the same BSS color as that of the wireless network connected/established to/by the self-apparatus, the printer 1002 controls the BSS color. More specifically, the printer prompts the AP 1001 to change the BSS color of the wireless network 1005 connected in the terminal mode, and changes the BSS color of the wireless network 1006 established in the base station mode. This can reduce the occurrence of signal collision between the wireless networks.

Note that the first and second embodiments have been described as individual embodiments but the two embodiments may be applied in combination.

Third Embodiment

The third embodiment will describe a form of detecting BSS color collision by a smartphone 1003. Assume that the system configuration of a wireless network is the same as in the second embodiment.

Operation of System

Figure 13:
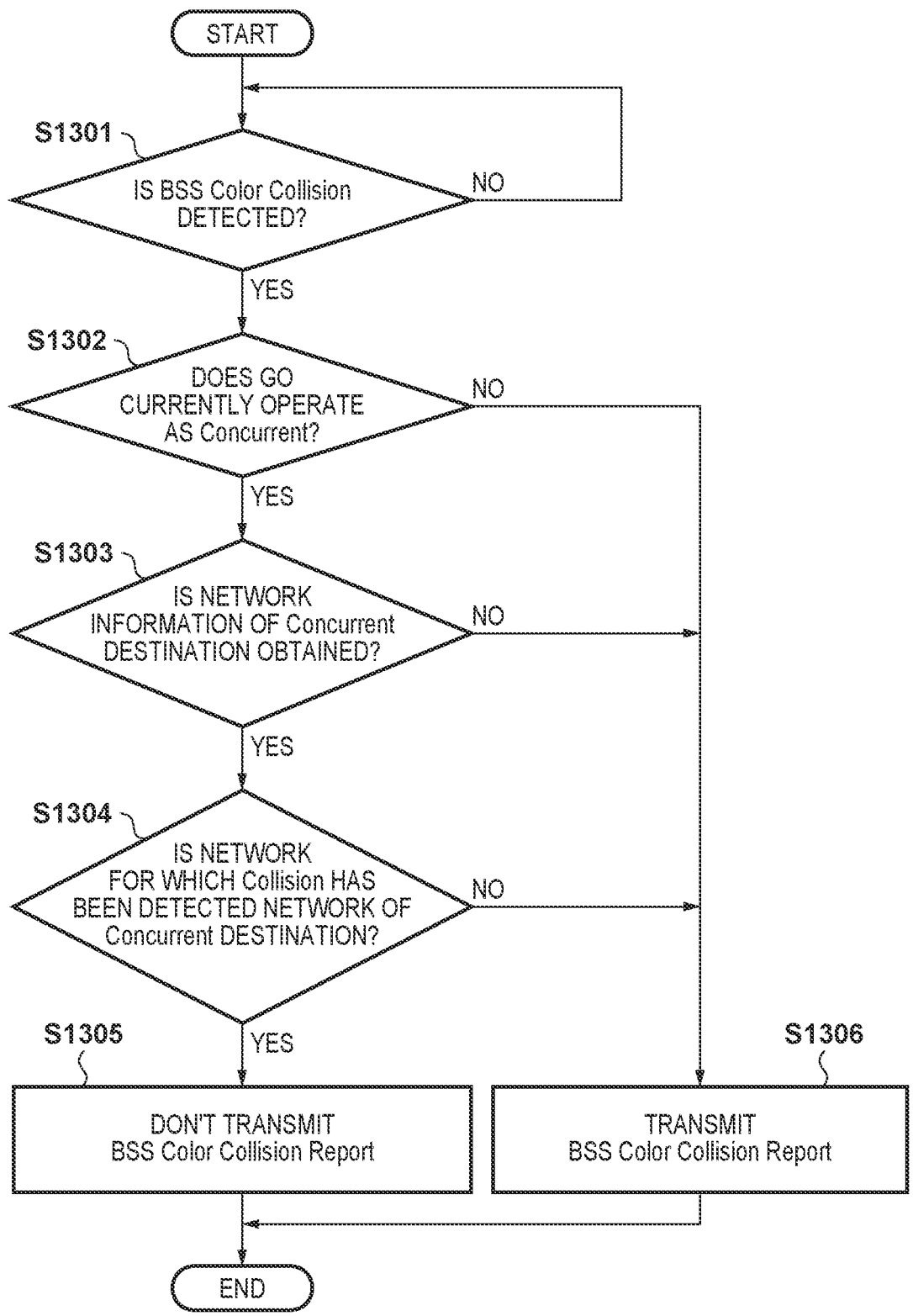
FIG. 13 is a flowchart illustrating an operation when detecting BSS color collision in a smartphone.

FIG. 13 is a flowchart illustrating an operation when detecting BSS color collision in the smartphone. In this example, the smartphone 1003 is connected, as a Wi-Fi Direct client, to a printer 1002 operating as a GO.

In step S1301, the smartphone 1003 detects BSS color collision. That is, the smartphone 1003 detects a wireless network of the same BSS color value as that of a wireless network 1006 to which the self-apparatus is currently connected. For example, the smartphone 1003 can detect such wireless network by receiving a wireless frame transmitted/received in another wireless network.

In step S1302, the smartphone 1003 determines whether the connection destination GO currently performs a concurrent operation, if the concurrent operation is currently performed, the process advances to step S1303; otherwise, the process advances to step S1306. Whether the concurrent operation is currently performed may be determined based on information included in a Wi-Fi Direct-related wireless frame. For example, a Concurrent_Operation bit in a Device_Capability_Bitmap included in a P2P_Capability_attribute may be referred to. If the Concurrent_Operation bit indicates that the concurrent operation is supported, it is determined that the connection destination GO supports the concurrent operation. Similarly, the determination processing may be performed with reference to a Cross_Connection bit in a Group_Capability_Bitmap included in the P2P_Capability_attribute. The Cross_Connection hit is a bit indicating that the connection destination GO is currently or to be cross-connected to another wireless network in the infrastructure mode. Cross-connection indicates a connection form in which it is possible to communicate with another wireless network via the GO.

The present invention is not limited to them and whether the GO currently performs the concurrent operation may be determined by another method. For example, an 802.11 wireless frame may be extended, and information indicating whether the GO currently performs the concurrent operation may be obtained, thereby performing determination. The present invention is not limited to the wireless frame, and packet information of a layer higher than a wireless layer may be used or information may be obtained using another wireless communication such as Bluetooth®.

In step S1303, the smartphone 1003 attempts to obtain network information of the concurrent connection destination of the GO. In this example, the smartphone 1003 obtains information of a wireless network 1005 to which the printer 1002 as a GO is connected by the concurrent operation. For example, the wireless frame may be extended and the frame including concurrent destination information may be transmitted/received to/from the GO, thereby obtaining the information. Alternatively, the smartphone 1003 may estimate the wireless network to which the printer 1002 is concurrently connected.

For example, the smartphone 1003 can obtain the device address (in this example, the MAC address) of the GO (in this example, the printer 1002) in Direct processing. There is proposed a method of virtually using one MAC address as two I/Fs in the respective wireless networks when the GO currently performs the concurrent operation using one RF circuit, More specifically, there is provided a method of setting the second lowest bit of the first byte of the MAC address as a GL (Global/Local) bit to use the MAC address as a global address and a local address. In this method, the MAC address in which the GL bit is set to "0" is used on the infrastructure mode side and the MAC address in which the GL bit is set to "1" is used on the GO side. Since the device address on the GO side may be the same as the MAC address in which the GL bit is set to "1", an attempt is made to estimate the MAC address on the infrastructure side from the device address. Then, a counter apparatus that performs communication is determined with respect to the above-described estimated MAC address in the wireless frame received by the same wireless channel. For example, wireless frames having the estimated MAC address as a destination address or a transmission source address are narrowed down to wireless frames of data communication or wireless frames for control associated with connection, and then communication of a counter apparatus may be detected. By using this method, it is possible to estimate a counter apparatus to which the connection destination GO is connected in the infrastructure mode in the concurrent operation.

Alternatively, the printer 1002 may be configured to notify the client apparatus of the BSSID or BSS color of the concurrent destination wireless network 1005. This notification may be made by extending the wireless frame or by a higher protocol than a wireless layer. The smartphone 1003 can receive such information from the printer 1002, thereby obtaining the information of the concurrent destination wireless network 1005 of the printer 1002.

Note that the present invention is not limited to the above method, and any method that can obtain the wireless network information of the concurrent destination can be used. If the network information of the concurrent destination of the GO can be obtained, the process advances to step S1304; otherwise, the process advances to step S1306.

In step S1304, the smartphone 1003 determines whether the wireless network for which BSS color collision has been detected is the wireless network of the concurrent destination of the currently connected GO. That is, it is determined whether the wireless network for which collision has been detected is the wireless network 1005. If it is determined that the wireless network for which collision has been detected is the wireless network of the concurrent destination of the currently connected GO, the process advances to step S1305; otherwise, the process advances to step S1306.

In step S1305, the smartphone 1003 determines not to transmit a BSS_Color_Collision_Report to the connection destination GO. After that, the BSS color collision detection processing ends. On the other hand, in step S1306, the smartphone 1003 transmits the BSS_Color_Collision_Report to the connection destination GO.

As described above, according to the third embodiment, the smartphone 1003 as a Wi-Fi Direct client detects a wireless network in which BSS color collision occurs. This can improve the efficiency of control processing along with BSS color collision between the GO and the client.

Modification

In each of the above-described embodiments, a case in which a BSS color value is used as identification information for identifying, a BSS has been described. However, arbitrary identification information that can identify a BSS can be used. That is, any identification information can identify whether an OBSS is the same type of BSS when using the SR processing.

A case in which the wireless channel of the wireless network established by the self-apparatus as a GO is the same as that of the wireless network of the AP to which the self-apparatus is currently connected as an STA has been described. If each wireless network is established by a different channel, a value different from the BSS color value of the wireless network currently connected in the infrastructure mode may be used as the BSS color value of the wireless network established by the self-apparatus as a GO. For example, there is a case in which one RF circuit and one antenna are time-divisionally used between concurrently operating wireless networks. Similarly, there is a case in which a communication apparatus formed by two or more RF circuits or antennas can use a different RF circuit or antenna for each wireless network. If networks can operate using different channels, data collision between the networks along with the concurrent operation of the communication apparatus is difficult to occur, and it is thus possible to efficiently use the SR processing in each network.

A case in which the printer serves as a Wi-Fi Direct GO to establish the wireless network has been described but the present invention is not limited to this. For example, the present invention is applicable to a case in which the printer operates in a simple AP mode ($\mu$AP or the like). In this case, the processing that uses a wireless frame unique to Wi-Fi Direct in each of the above-described embodiments is implemented by replacing the wireless frame by another wireless frame. Alternatively, the processing may be implemented by extending the wireless frame. Furthermore, the present invention may be applied to a case in which the printer operates in an ad-hoc mode. The present invention is not limited to them, and any method in which the printer can establish a wireless network using a BSS color value by itself may be used.

Similarly, each of the above-described embodiments has explained the form in which the printer operates as an STA in the infrastructure mode to be connected to the AP. However, the printer may operate in the ad-hoc mode instead of the infrastructure mode. Alternatively, the present invention is applicable to a case in which the printer operates as a Direct client to be connected to another GO apparatus.

A case in which the printer operates as an STA and operates as a GO has been described. However, the present invention is also applicable to a case in which the printer operates as a GO while the operation as an STA is stopped. In this case, setting information of the AP to which the printer is connected as an STA is stored in the storage unit 207, and a BSS color value is stored together with the setting information. Then, when operating as a GO, the printer establishes the wireless network using the BSS color value stored in the storage unit 207. If there are a plurality of pieces of setting information, the selling information of the AP to which the printer is connected last as an STA is used to set a BSS color value to be used for the wireless network of the GO. Alternatively, priority levels may be added to the pieces of setting information, and the BSS color value of the setting information having the highest priority level may be used.

Each of the above-described embodiments has explained the wireless LAN communication form complying with the IEEE802.11 series but the present invention is not limited to this. For example, the present invention may be applied to a predetermined frame using a wireless communication medium such as a wireless USB, MBOA, Bluetooth®, UWB, ZigBee, or NFC. Note that MBOA is an abbreviation for Multi Band OFDM Alliance. Furthermore. UWB includes a wireless USB, wireless 1394, and WINET.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus operable in both a base station mode of establishing a wireless network and accepting connection from another apparatus and a terminal mode of performing connection to a wireless network established by another apparatus, the communication apparatus comprises one or more memories storing instructions and one or more processors that execute the instructions to:
    obtain Basic Service Set (BSS) color of a first wireless network to be connected in the terminal mode; and
    establish, if operating in the base station mode, a second wireless network having the same BSS color as the obtained BSS color,
    wherein after the second wireless network having first BSS color is established, if the BSS color of the first wireless network is changed from the first BSS color to second BSS color, the one or more processors execute the instructions to change the BSS color of the second wireless network to the second BSS color.

2. The communication apparatus according to claim 1, wherein if the first wireless network and the second wireless network use the same wireless channel, the one or more processors execute the instructions to establish the second wireless network having the same BSS color as the obtained BSS color.

3. The communication apparatus according to claim 2, wherein if communication using an SR (Spatial Reuse) function defined by Institute of Electrical and Electronics Engineers (IEEE) 802.11ax can be used in both the first wireless network and the second wireless network, the one or more processors execute the instructions to establish the second wireless network having the same BSS color as the obtained BSS color.

4. The communication apparatus according to claim 1, wherein
    the first wireless network and the second wireless network are wireless networks complying with IEEE802.11ax, and
    the BSS color is a BSS color defined by IEEE802.11ax.

5. The communication apparatus according to claim 4, wherein the one or more processors execute the instructions to obtain the BSS color of the first wireless network from an HE-SIG-A field of an HE_SU_PPDU frame.

6. The communication apparatus according to claim 1, wherein
    if the BSS color of the first wireless network cannot be obtained, the one or more processors execute the instructions to establish the second wireless network having arbitrary first BSS color, and
    after the second wireless network having the first BSS color is established, if second BSS color different from the first BSS color is obtained, the one or more processors execute the instructions to change the BSS color of the second wireless network to the second BSS color.

7. The communication apparatus according to claim 1, the one or more processors execute the instructions to:
    receive, from another apparatus connected to the second wireless network, a first notification for notifying that there exists a third wireless network having the same BSS color as the BSS color of the second wireless network;
    determine whether the third wireless network and the first wireless network are the same wireless network; and
    transmit, if it is determined that the third wireless network and the first wireless network are not the same wireless network, a second notification for notifying that there exists another wireless network having the same BSS color as the BSS color of the first wireless network to another apparatus establishing the first wireless network.

8. The communication apparatus according to claim 1, wherein
    the base station mode is a mode of operating as a group owner (GO) in Wi-Fi Direct, and
    the terminal mode is a mode of operating as a station (STA) in an infrastructure mode.

9. A control method for a communication apparatus operable in both a base station mode of establishing a wireless network and accepting connection from another apparatus and a terminal mode of performing connection to a wireless network established by another apparatus, comprising:
    obtaining Basic Service Set (BSS) color of a first wireless network to be connected in the terminal mode; and
    establishing, if operating in the base station mode, a second wireless network having the same BSS color as the obtained BSS color,
    wherein after the second wireless network having first BSS color is established, if the BSS color of the first wireless network is changed from the first BSS color to second BSS color, the BSS color of the second wireless network is changed to the second BSS color.

10. A non-transitory computer-readable recording medium storing a program for causing a computer connected to a wireless communication unit to function as a communication apparatus operable in both a base station mode of establishing a wireless network and accepting connection from another apparatus and a terminal mode of performing connection to a wireless network established by another apparatus, the communication apparatus comprises one or more memories storing instructions and one or more processors that execute the instructions to:
    obtain Basic Service Set (BSS) color of a first wireless network to be connected in the terminal mode; and establish, if operating in the base station mode, a second wireless network having the same BSS color as the obtained BSS color, wherein after the second wireless network having first BSS color is established, if the BSS color of the first wireless network is changed from the first BSS color to second BSS color, the one or more processors execute the instructions to change the BSS color of the second wireless network to the second BSS color.

\* \* \* \* \*